United States Patent
Nagaya et al.

(10) Patent No.: US 7,214,049 B2
(45) Date of Patent: May 8, 2007

(54) SYSTEM FOR CONTROLLING NOZZLE TOUCH FORCE

(75) Inventors: Motohiro Nagaya, Yamanashi (JP);
Tatsuya Kawasaki, Yamanashi (JP);
Nobuaki Hashimoto, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 434 days.

(21) Appl. No.: 10/936,654

(22) Filed: Sep. 9, 2004

(65) Prior Publication Data
US 2005/0053685 A1    Mar. 10, 2005

(30) Foreign Application Priority Data
Sep. 9, 2003    (JP)    ............................ 2003-316785

(51) Int. Cl.
*B29C 45/77*    (2006.01)
(52) U.S. Cl. .................. 425/145; 264/40.7; 425/150
(58) Field of Classification Search ................ 425/145, 425/150; 264/40.7
See application file for complete search history.

(56) References Cited

U.S. PATENT DOCUMENTS 5,356,281 A * 10/1994 Katsuno et al. ............. 425/209
7,021,924 B2 * 4/2006 Oyama ....................... 425/571

FOREIGN PATENT DOCUMENTS

| EP | 0 983 835 A2 | 3/2000 |
|---|---|---|
| JP | 6-79759 * | 3/1992 |
| JP | 6-17038 | 3/1994 |
| JP | 7-60797 | 3/1995 |
| JP | 7-106580 | 11/1995 |
| JP | 2000-868 | 1/2000 |
| JP | 2001-124169 | 5/2001 |
| JP | 2003-191285 | 7/2003 |

* cited by examiner

*Primary Examiner*—Tim Heitbrink
(74) *Attorney, Agent, or Firm*—Drinker Biddle & Reath LLP

(57) ABSTRACT

A system for controlling nozzle touch force, which is capable of maintaining the touch force relying upon a simple constitution. An electric motor moves the injection unit forward via a spring to bring a nozzle into contact with a metal mold. Further, the spring is compressed to impart a preset nozzle touch force. In the injection/pressure-maintaining step, the screw is driven, and a position/speed detector provided on a servo motor for injecting the resin detects the injection speed at regular intervals. A force produced by the force of inertia of the moving portions such as the injection screw and the pusher plate that move due to the injection operation, is found from the acceleration that is found from the injection speed. The amount of compression of the spring is controlled by varying the rotational position of the motor by an amount corresponding to the force that is found to maintain the nozzle touch force constant. Since the nozzle touch force is maintained constant, no resin leaks and an excess of nozzle touch force is not produced, either.

5 Claims, 9 Drawing Sheets

SYSTEM FOR CONTROLLING NOZZLE TOUCH FORCE

BACKGROUND OF THE INVENTION

1. Field of the Invention

The present invention relates to an injection-molding machine and, particularly, to a system for controlling the nozzle touch force of the injection-molding machine.

2. Description of the Related Art

In a nozzle touch mechanism which moves an injection unit as a whole to bring it into contact with a metal mold, the injection unit mounted on a base so as to move back and forth is driven by a nozzle touch force generating device to bring the nozzle of the injection unit into contact with the metal mold. A known nozzle touch force generating device utilizes a hydraulic cylinder or a spring force expanded by the force of a motor to hold the nozzle in contact with to the metal mold (see Japanese Examined Patent Publication (Kokoku) No. 6-17038)

There is further known a nozzle touch mechanism which pushes the nozzle onto the metal mold with a predetermined pressure by using a hydraulic pressure. The nozzle touch force has heretofore been controlled in a manner as described above, i.e., the output of the nozzle touch force generating device is maintained constant to hold the nozzle so as to be pushed onto the metal mold.

There is further known a control method in which an injection unit is provided with a distortion sensor to set the nozzle touch force easily and at any value, and a servo motor is controlled relying on a feedback signal from the distortion sensor to advance the injection unit thereby to obtain a desired nozzle touch force (see Japanese Examined Patent Publication (Kokoku) No. 7-106580).

In order to cancel the reaction force generated by the force of inertia of the moving member of the injection unit at the time of acceleration or deceleration of injection, there is also known an invention according to which moving members are provided to move in directions opposite to each other, and the force of inertia is excluded so that the members of the injection-molding machine will not be broken or the control characteristics deteriorated (see Japanese Unexamined Patent Publication (Kokai) No. 2001-124169).

There is further known an invention according to which the reaction force in the axial direction acting on a screw is detected by using a load cell provided downstream of the screw, the force of inertia of the moving part such as the screw that is generated at the time of acceleration or deceleration of injection is found to correct the reaction force, in order to correctly find the pressure exerted on the molten resin (see Japanese Unexamined Patent Publication (Kokai) No. 2003-191285).

To prevent leakage of the molten resin from a position where the nozzle and the metal mold are in contact with each other, it is desirable to maintain constant the nozzle touch force in the nozzle touch mechanism. At the time of acceleration of injection, however, the nozzle touch force for pushing the nozzle touch surface drops, being affected by the force of inertia of the moving member such as the injection screw or the pusher plate of the injection unit. FIGS. 9a and 9b are diagrams illustrating the nozzle touch force in a conventional nozzle touch force generating device by utilizing a spring. FIG. 9a illustrates the injection speed of when the injection screw advances in the injection unit to inject the molten resin in the heating cylinder into a metal mold, and FIG. 9b illustrates the nozzle touch force at the time of injection.

When the injection operation starts in a state where a predetermined nozzle touch force fs is generated due to the compression of the spring, there occurs a drop in the nozzle touch force for pushing the nozzle touch surface at the time of acceleration of injection due to the force of inertia of the moving members such as the injection screw and the pusher plate in the injection unit. At the time of deceleration of injection, on the other hand, the nozzle touch force increases due to the force of inertia of the moving part of the injection unit. FIG. 9b illustrates an increase and a decrease of the nozzle touch force by f1 at the time of acceleration and deceleration of injection.

When the nozzle touch force becomes smaller than a force produced by the resin pressure, the injection unit is pushed back, permitting the resin to leak. So far, therefore, the nozzle touch surface had been pushed with a sufficiently large nozzle touch force so that there was no leakage of resin despite the nozzle touch force having dropped being affected by the acceleration of injection. When pushed with a large nozzle touch force, however, the metal mold deflects and/or a parallel relationship of the mold is not maintained, giving rise to problems with regard to a drop in the quality of the molded article and a decrease in the life of the metal mold. As shown in FIG. 9b, also, the nozzle touch force increases due to the force of inertia at the time of deceleration in the injection speed, causing a further decrease in the life of the metal mold.

SUMMARY OF THE INVENTION

It is therefore an object of the present invention to provide a system for controlling the nozzle touch force, which is simple in structure and is capable of easily maintaining a predetermined nozzle touch force.

A system for controlling the nozzle touch force provided by the present invention is the one for an injection-molding machine having a base and an injection unit arranged on the base so as to move back and forth, and comprises a nozzle touch force generating unit for imparting a nozzle touch force to the injection unit, an arithmetic section for finding an acceleration of a moving part in the injection unit at the time of injection, and a control section for controlling increase or decrease of the nozzle touch force generated by the nozzle touch force generating unit depending upon the acceleration of the moving portion.

The arithmetic section finds the acceleration based on the injection speed read in a predetermined period.

The nozzle touch force generating unit includes a spring and an electric motor for expanding and contracting the spring, generates the nozzle touch force relying upon the amount of expansion and contraction of the spring, and the control section measures the amount of expansion and contraction of the spring, and increases or decreases the amount of expansion or contraction of the spring by a correcting amount of expansion or contraction calculated by multiplying the acceleration of the moving portion of the injection unit by a preset value, to so control the electric motor as to produce a predetermined nozzle touch force.

Alternatively, the nozzle touch force generating unit includes an electric motor the torque of which can be controlled to generate a nozzle touch force relying upon the output torque of the electric motor, and the control unit increases or decreases a value of the output torque of the motor by a correcting torque value calculated by multiplying the acceleration of the moving part of the injection unit by the preset value, to so control the electric motor as to produce a predetermined nozzle touch force.

As another alternative, the nozzle touch force generating unit includes a cylinder the pressure of which can be controlled to generate a nozzle touch force relying upon the pressure of the cylinder, and the control unit increases or decreases a value of the pressure in the cylinder by a correcting pressure value calculated by multiplying the acceleration of the moving part of the injection unit by the preset value, to so control the cylinder as to produce a predetermined nozzle touch force.

Further, the nozzle touch force generating unit may be constituted by a cylinder the pressure of which can be controlled and an electric motor for expanding and contracting the spring, may be constituted by the cylinder the pressure of which can be controlled and another electric motor the torque of which can be controlled, or may be constituted by the electric motor the torque of which can be controlled and another electric motor for expanding and contracting the spring. Either one of the two nozzle touch force generating means may be controlled in its output based on the acceleration of injection to maintain a predetermined nozzle touch force.

BRIEF DESCRIPTION OF THE DRAWINGS

The above and other objects, features and advantages of the present invention will be made more apparent, from the following description of the preferred embodiments thereof, with reference to the accompanying drawings, wherein:

FIG. 8b is a diagram illustrating a change in the nozzle touch force, which is related to FIG. 8a;

FIG. 9b is a diagram illustrating a change in the nozzle touch force, which is related to FIG. 9a.

DETAILED DESCRIPTION OF THE INVENTION

In order to maintain the nozzle touch force at the time of injection constant at all times without being affected by the force of inertia of the moving member during the acceleration or deceleration of injection according to the present invention, the acceleration (acceleration of injection screw) at the time of injection is found, the force affecting the nozzle touch force is found from the acceleration, and the force generated by nozzle touch force-generating means is controlled. At the time of injection, the moving members such as the injection screw and the pusher plate are accelerated and decelerated as a result of injecting the molten resin. The force of inertia is obtained by multiplying the acceleration at the time of acceleration or deceleration by the mass of a moving member that is accelerated or decelerated. Therefore, the force that affects the nozzle touch force is found by multiplying the acceleration at the time of injection by a predetermined constant. According to the present invention, the force of inertia that accompanies the acceleration or deceleration at the time of injection affecting the nozzle touch force is found through software processing to control the nozzle touch force.

Figure 1:
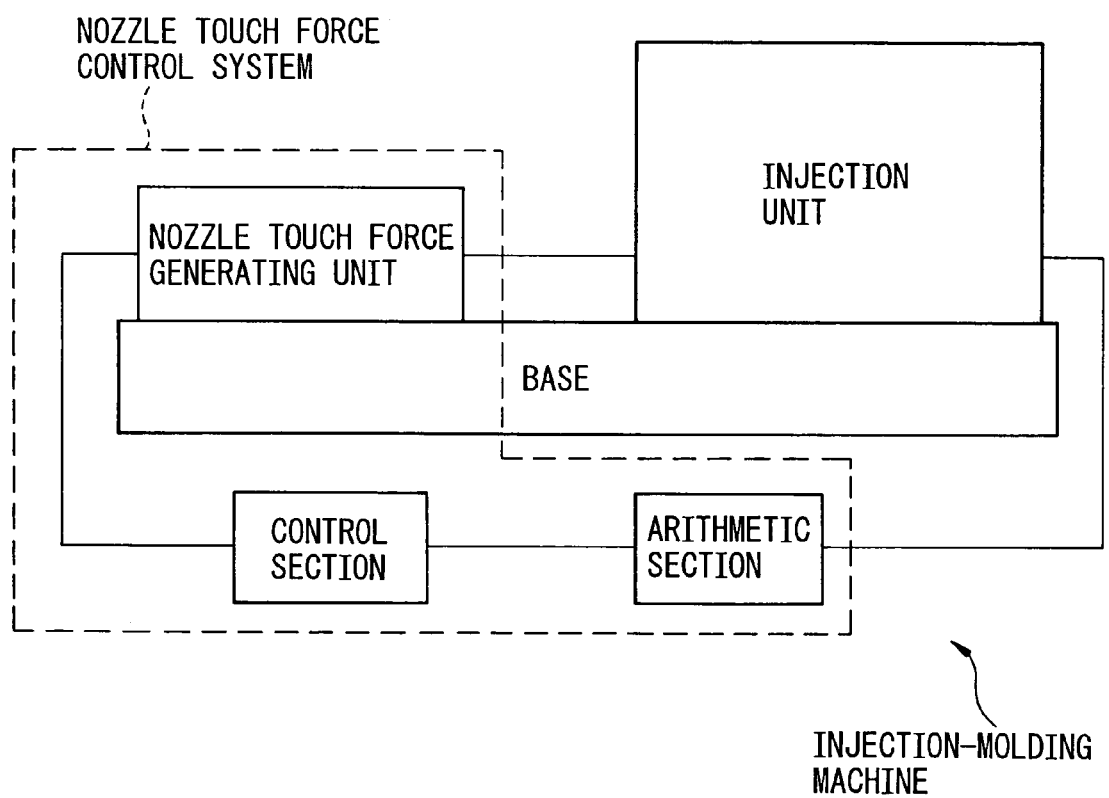
FIG. 1 is a block diagram illustrating the fundamental constitution of the present invention.

FIG. 1 is a block diagram illustrating the fundamental constitution of the invention. An injection-molding machine includes a base and an injection unit arranged on the base so as to move back and forth. The system for controlling a nozzle touch force for the injection-molding machine comprises a nozzle touch force generating section or a generating unit for imparting a nozzle touch force to the injection unit, an arithmetic section for finding an acceleration of a moving part in the injection unit at the time of injection, and a control section for increasing or decreasing the nozzle touch force generated by the nozzle touch force generating unit depending upon the acceleration of the moving part.

Figure 2:
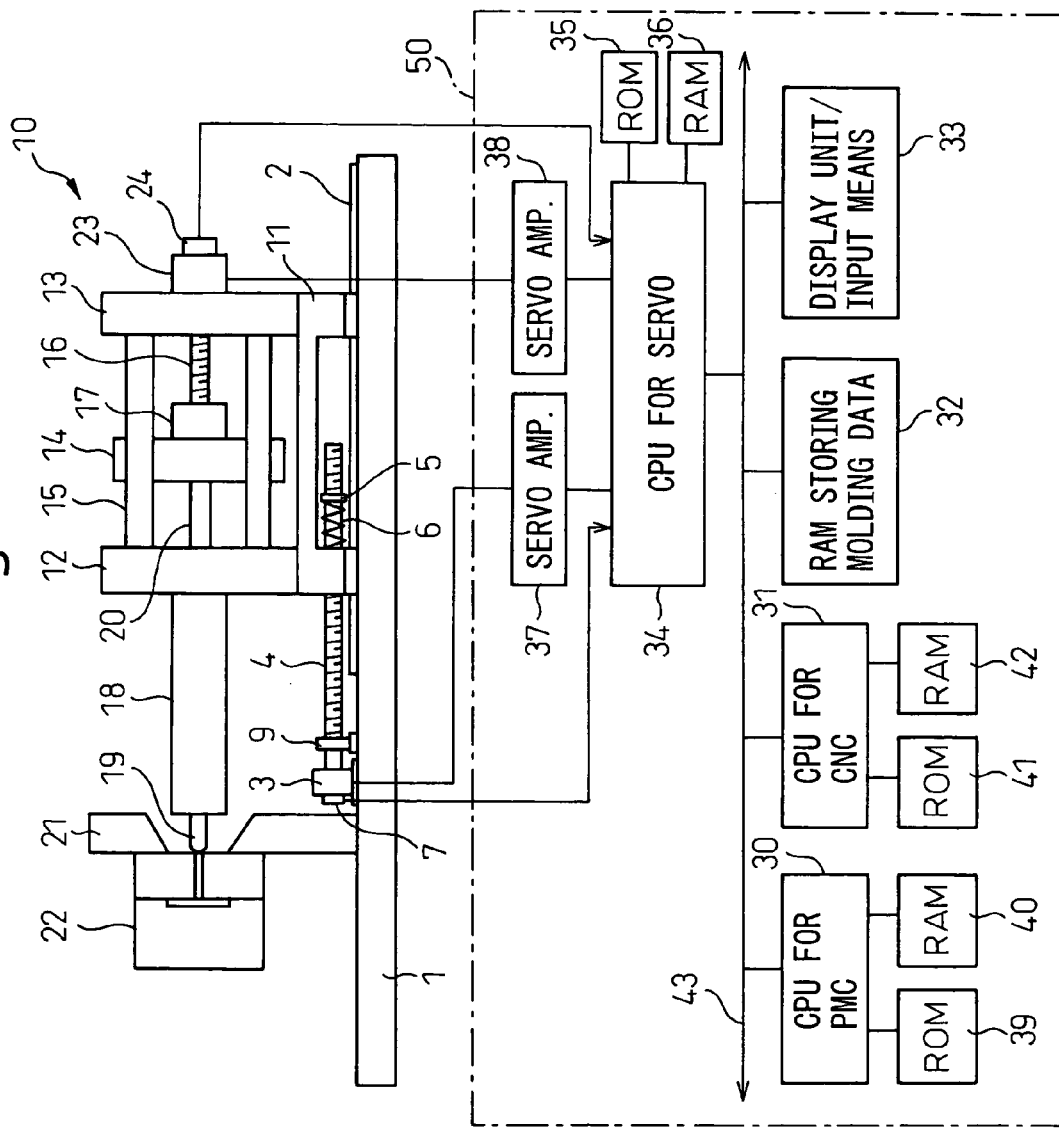
FIG. 2 is a diagram illustrating a major portion according to a first embodiment of the present invention.

FIG. 2 is a diagram illustrating a major portion according to a first embodiment of the present invention. As shown, on a rail 2 provided on the base 1 of the injection-molding machine, there is arranged a unit base 11 that constitutes a portion of the injection unit 10 so as to move back and forth. An injection mechanism is mounted on the unit base 11 so as to be turned for the replacement and maintenance of the injection screw. The injection mechanism includes a front plate 12, a rear plate 13, and a pusher plate 14 guided by a plurality of guide bars 15 coupling the front plate 12 and the rear plate 13 together, and a nut 17 is secured to the pusher plate 14 so as to be screwed onto a ball screw 16 for injection. The pusher plate 14 rotatably holds an injection screw 20 that is inserted in the heating cylinder 18. A nozzle 19 is provided at an end of the heating cylinder 18, and is allowed to come in contact with, or separate away from, a metal mold 22 mounted on a stationary platen 21. A servo motor 23 provided on the rear plate 13 drives the ball screw 16 to advance the pusher plate 14 and the injection screw 20 via the nut 17 thereby to inject a molten resin.

A nozzle touch force generating section or a nozzle touch force generating unit is arranged on the unit base 11. The nozzle touch force generating unit is constituted by a motor 3 secured to the base 1, a coupling member 9 secured to the base 1 for coupling the rotor shaft of the motor 3 to a ball screw 4 and for supporting the ball screw 4 maintaining the freedom of rotation but inhibiting its motion in the axial direction, a nut member 5 screwed onto the ball screw 4 and moves back and forth being guided by a guide rod (not shown) provided between the legs of the unit base 11, and a spring 6 arranged between the nut member 5 and the leg of the unit base 11 and undergoes the expansion and contraction accompanying the motion of the nut member 5. As the motor 3 is driven to rotate the ball screw 4, the nut member 5 screwed onto the ball screw 4 moves in the axial direction being guided by the guide rod. As the nut member 5 moves forward (toward the left in FIG. 2), the spring 6 is compressed, the unit base 11 moves forward, and the injection mechanism mounted on the unit base 11 moves forward. According to this constitution, the injection unit 10 moves forward, the nozzle 19 is brought in contact with the metal mold 22, the amount of expansion or contraction of the spring is detected by a sensor, and a nozzle touch force corresponding to the amount of the expansion or contraction is generated.

Further, a system 50 for controlling the nozzle touch force according to the first embodiment is the one for controlling the injection-molding machine, and includes an arithmetic section or a CPU 30 which is a microprocessor for a programmable machine controller (PMC), a CPU 31 which is a microprocessor for computer numerical control (CNC), and a control section or a CPU 34 which is a microprocessor for servo control. The data can be transmitted among the microprocessors upon selecting their inputs and outputs via a bus 43.

The CPU 30 for PMC is connected to a ROM 39 storing a sequence program for controlling the sequence operation of the injection-molding machine and to a RAM 40 used for temporarily storing the operation data. The CPU 31 for CNC is connected to a ROM 41 storing an automatic operation program for controlling the whole injection-molding machine and to a RAM 42 used for temporarily storing the operation data.

The CPU 34 for servo is connected to a ROM 35 storing a control program exclusively for servo control for executing the processings of a position loop, a speed loop and a current loop, and to a RAM 36 for temporarily storing the data. The CPU 34 for servo is further connected to one or more servo amplifiers for driving servo motors of various shafts for tightening the mold, for injecting the resin, for rotating the screw, for activating the injector and for touching the nozzle based upon the instructions from the CPU 34. The outputs from the position/speed detectors mounted on the servo motors of various shafts are fed back to the CPU 34 for servo. FIG. 2 illustrates the servo motor 3 for touching the nozzle related to the present invention, a position/speed detector 7 for detecting the position and speed of the servo motor 3, the servo motor 23 for injection which rotates the ball screw 16 to drive the pusher plate 14 and the injection screw 20 in the axial direction, a position/speed detector 24 for detecting the position and speed of the servo motor 23, a servo amplifier 37 for the servo motor for touching the nozzle, and a servo amplifier 38 for the servo motor for injection.

A RAM 32 which is a nonvolatile memory for saving data is connected to the bus 43. The RAM 32 for saving data stores the molding data including molding conditions related to the work of injection molding, a variety of preset values, parameters and macro variables. The bus 43 is further connected to a display device constituted by liquid crystals or a CRT for displaying a variety of preset data, and to a display unit/input means 33 constituted by input means such as a keyboard for inputting various data and instructions.

Being constituted as described above, the CPU 30 for PMC controls the sequence operation of the whole injection-molding machine, the CPU 31 for CNC distributes the instructions of motion to the servo motors of various shafts based on the operation program stored in the ROM 41 and on the molding conditions stored in the RAM 32 for saving data, and the CPU 34 for servo executes servo controls such as a position loop control, a speed loop control and a current loop control in the same manner as described above based on the instructions of motion distributed to the shafts and on the position and speed feedback signals detected by the position/speed detector, thereby to execute the so-called digital servo processing.

Figure 3:
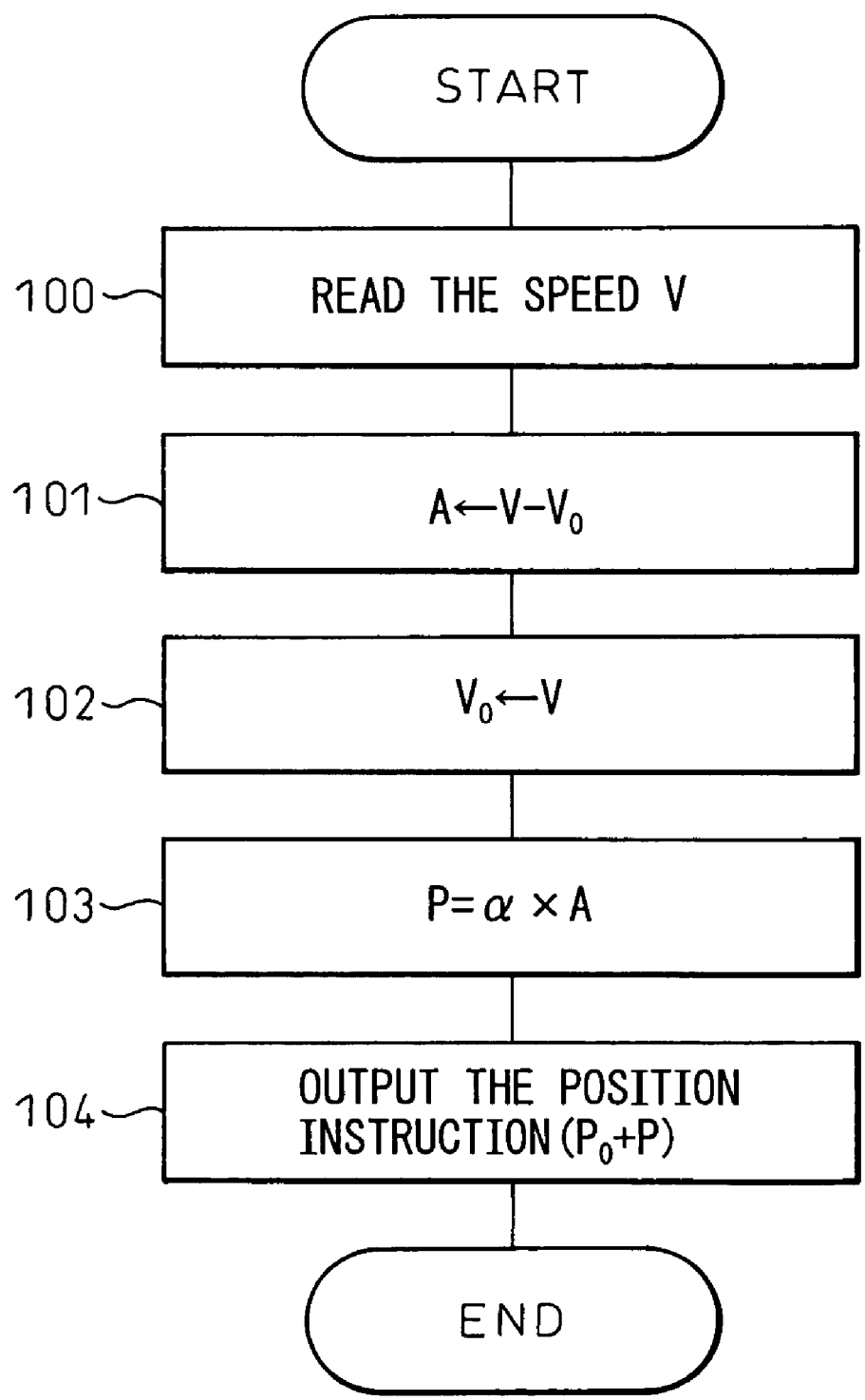
FIG. 3 is a flowchart illustrating a nozzle touch force control processing executed at regular intervals in the injection/pressure-maintaining step according to the first embodiment.

The system for controlling the nozzle touch force constituted as described above of the invention executes the processing illustrated in FIG. 3 during the injection/pressure-maintaining step at regular intervals to maintain the nozzle touch force constant by correcting the effect due to the acceleration or deceleration of the moving part in the injection unit at the time of injection.

Here, if a mass of the moving portions such as the injection screw and the pusher plate that move at the time of injection is denoted by m, the acceleration of injection by a, a nozzle touch force by fn, a spring constant of the spring 6 by k, an initial amount of expansion and contraction of the spring by x and an increment of expansion and contraction of the spring (correction amount) by dx, then, the acceleration a of injection is found, and the nozzle touch force is maintained constant by adjusting the increment of expansion and contraction of the spring (correction amount) dx in a manner such that the following formula holds, $$m \cdot a + fn - k(x + dx) = 0$$

Based on this formula, if the motor 3 is controlled such that there is obtained $dx = m \cdot a/k$, then, $fn = k \cdot x$, and the nozzle touch force can be maintained constant.

First, servo motor 3 constituting the nozzle touch force generating unit is driven, in the same manner as in the prior art, to move forward (toward the left in FIG. 2) the injection unit 10 via the ball screw 4, nut member 5 and spring 6 so that the nozzle 19 comes in contact with the metal mold 21 while compressing the spring 6. Then, when the position/speed detector 7 detects the amount of compression of the spring 6 that has reached a predetermined value to generate a preset nozzle touch force, the servo motor 3 is no longer driven but is maintained at a position where it is. Here, the position $P_0$ of the servo motor 3 detected by the position/speed detector 7 is read by the CPU 30 for PMC and is stored in the memory.

As the injection starts, the arithmetic section or the CPU 30 for PMC executes the processing illustrated in FIG. 3 at regular intervals. First, the injection speed V fed back from the position/speed detector 24 mounted on the servo motor 23 for injection is read out through the CPU 34 for servo (step 100), and the acceleration A is found by subtracting, from the injection speed V, the injection speed $V_0$ that was read in a period before being stored in the register (step 101). Here, the register for storing the injection speed stores "zero" at the start of injection. Next, the injection speed V detected in the above period is stored as the injection speed $V_0$ of the previous period (step 102).

Next, the acceleration A found at the step 101 is multiplied by a predetermined coefficient α to find a moving amount (number of revolutions) P of the servo motor 3 that determines the correcting amount of expansion and contraction of the spring 6 at the time of generating a force corresponding to the force of inertia produced due to the acceleration A (step 103). The thus found moving amount P is added to the instructed position $P_0$ that is determined first, and a new position instructed to the corrected position ($P_0 + P$) is output to the servo motor 3 (step 104). Upon receipt of the position instruction, the servo motor 3 rotates and is brought to the instructed position. Hereinafter, this processing is executed during the injection/pressure-maintaining step at regular intervals.

At the start of injection, the screw 20 and the pusher plate 14 are accelerated. Therefore, the acceleration A found at the step 101 assumes a positive value. This value is multiplied by the coefficient α to find a positive moving amount P. The moving amount P is added to the position $P_0$ to produce a new position instruction. Then, the servo motor 3 rotates to the instructed position ($P_0+P$) thereby to further compress the spring 6 by the correcting amount of expansion and contraction. Here, the spring 6 has a positive direction in a direction in which it is compressed.

As the spring 6 is compressed, an increased force is produced by the spring 6 in a direction in which the injection unit moves forward. This force works to cancel the force that is produced accompanying the acceleration of the moving members such as the screw 20 in the injection unit and the pusher plate 14 and that moves the injection unit 10 back. Therefore, the nozzle touch force with which the nozzle 19 is pushed onto the metal mold 22 does not substantially vary or varies only little. As a result, the nozzle touch force does not decrease, and the molten resin does not leak through the nozzle touch portion.

On the other hand, as the injection speed decelerates and the acceleration A assumes a negative sign, the instructed position is subtracted from the initially instructed position $P_0$ by an amount corresponding to the acceleration A. Therefore, the amount of compression of the spring 6 decreases by a correcting amount of expansion and contraction, and a decreased force is produced by the spring for pushing the nozzle 19 toward the metal mold 22. Here, however, the force produced accompanying the deceleration of the moving member in the injection unit works to push the nozzle 19 toward the metal mold 22. Accordingly, the nozzle touch force is maintained nearly constant.

Figure 8A:
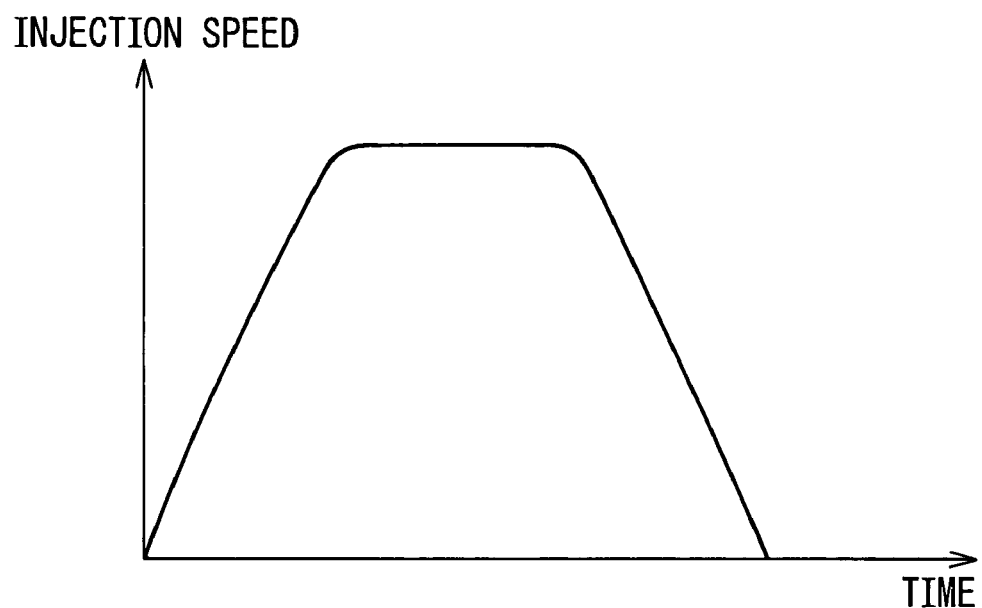
FIG. 8a is a diagram illustrating a change in the injection speed according to the embodiments of the invention.
Figure 8B:
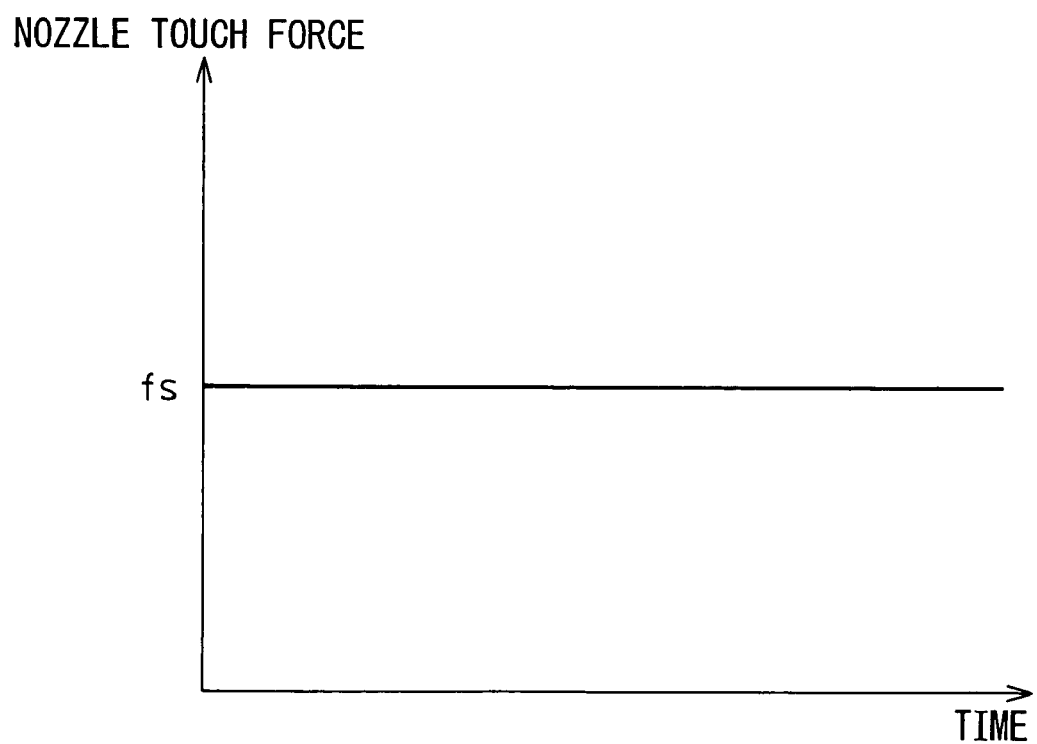

FIGS. 8a and 8b illustrate a relationship between the injection speed in the injection/pressure-maintaining step and the nozzle touch force according to the embodiment from which it will be learned that the nozzle touch force is maintained at a preset constant value fs irrespective of when the injection speed has increased or decreased. Thus, the nozzle touch force is maintained at the constant value fs; i.e., the molten resin does not leak through the nozzle touch portion, which may occur when the nozzle touch force decreases or an excess of nozzle touch force does not act on the metal mold.

As described above, the invention eliminates the effect of the force of inertia that causes the injection unit to move back or forth accompanying the acceleration or deceleration of the moving member in the injection unit during the injection/pressure-maintaining step. Therefore, the nozzle touch force is maintained nearly at the preset value at all times. Accordingly, the molten resin does not leak and the excess of nozzle touch force does not act on the metal mold 22, either.

In the above-mentioned first embodiment, a servo motor is used as the electric motor that constitutes the nozzle touch force generating unit, and the amount of expansion or contraction of the spring is detected relying upon its rotational position. It is, however, also possible to use a linear motor as the servo motor and detect the amount of expansion or contraction of the spring relying upon the position of the linear motor.

It is further allowable to use an ordinary electric motor instead of the servo motor, to detect the amount of expansion or contraction of the spring by using a length-measuring sensor such as a linear scale, and to control the rotational position of the motor relying upon the amount of expansion or contraction of the spring 6 detected by the length-measuring sensor. It is further possible to arrange a plurality of contactless switches and to control the nozzle touch force by controlling the rotational position of the motor relying upon the signals from the contactless switches.

Figure 4:
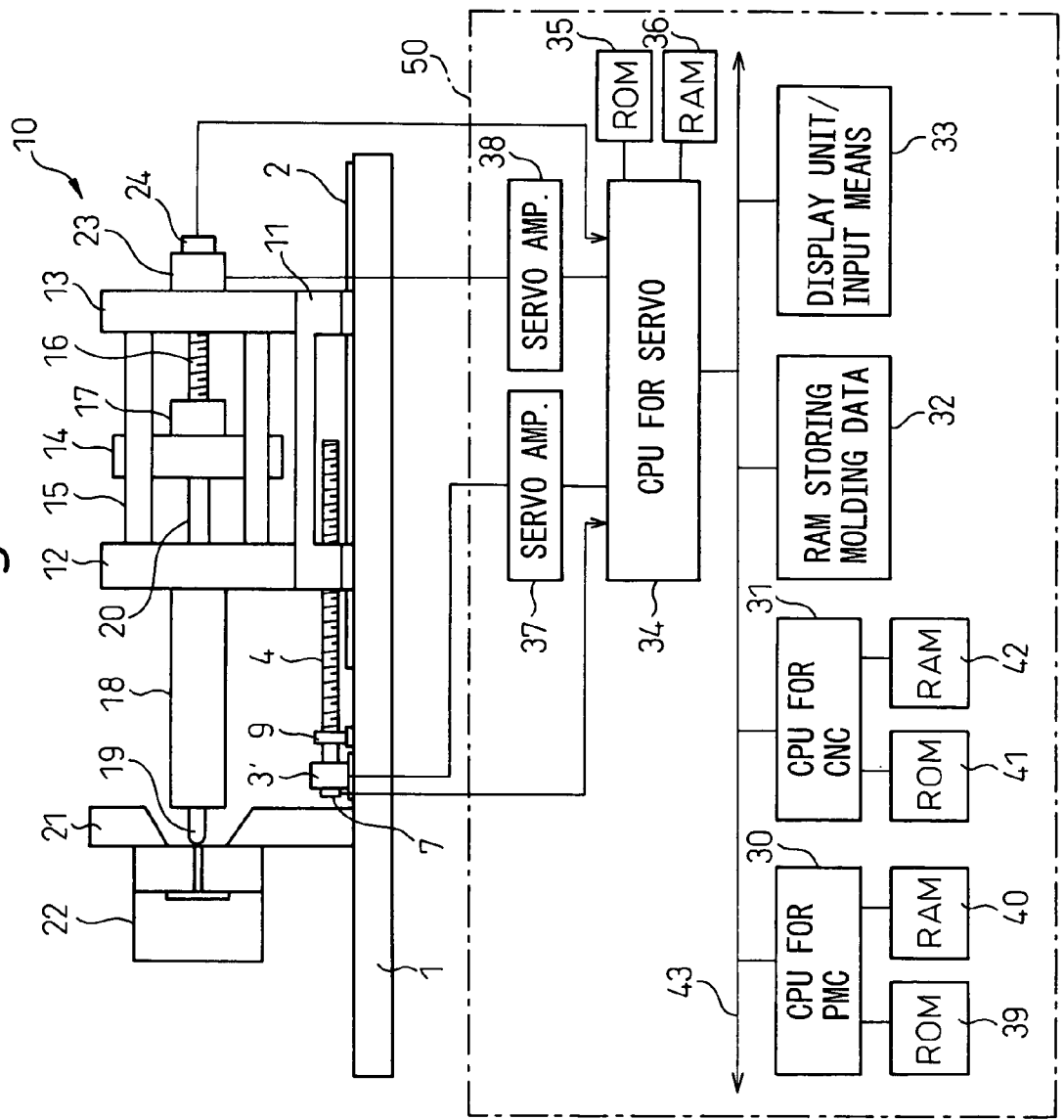
FIG. 4 is a diagram illustrating a major portion according to a second embodiment of the present invention.

FIG. 4 is a diagram illustrating the major portion according to a second embodiment of the present invention. In the second embodiment, an electric motor 3' the output torque of which can be controlled is used instead of the servo motor 3 shown in FIG. 2, the ball screw driven by the electric motor 31 the torque of which can be controlled is screwed into a nut (not shown) secured to the unit base 11 of the injection unit without using spring 6, the injection unit 10 is driven directly by the ball screw/nut mechanism utilizing the torque of the motor 3' the torque of which can be controlled, and the output torque of the motor 3' the torque of which can be controlled is controlled such that the nozzle touch force is in agreement with the preset value at all times. Further, the CPU 34 for servo produces a torque instruction through an amplifier of the motor 3' the torque of which can be controlled.

In the second embodiment, the CPU 30 for PMC sends a torque instruction To corresponding to a preset nozzle touch force to the motor 3' of which the torque can be controlled through the CPU 34 for servo and the amplifier. Being driven by the electric motor 3', the ball screw rotates, the injection unit moves forward due to the nut screwed onto the ball screw, and the nozzle 19 comes in contact with the metal mold 22. When the injection unit 10 is no longer moved, the electric motor 3' produces the torque $T_0$ as instructed, and the nozzle touch force is maintained at the preset nozzle touch force.

Figure 5:
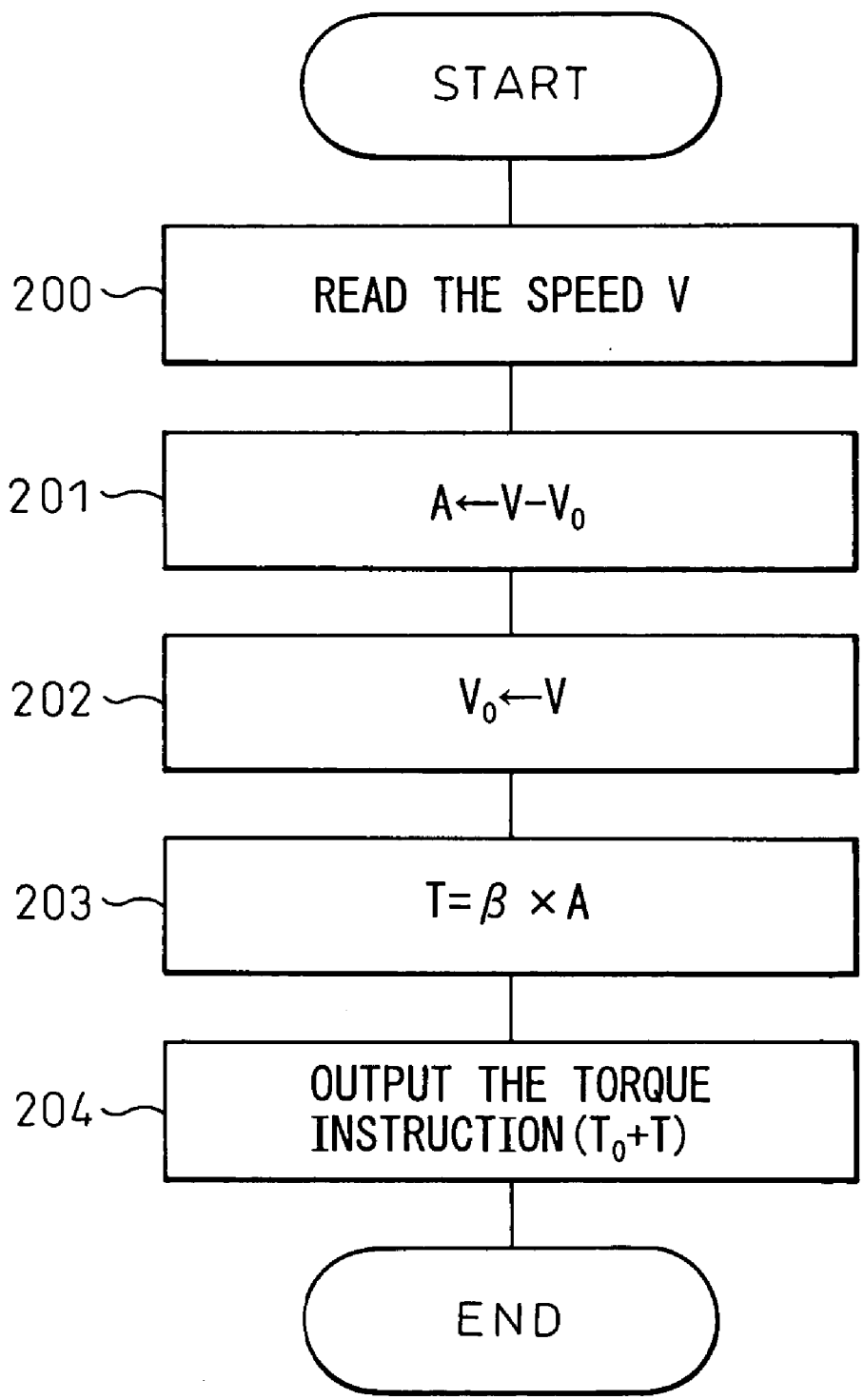
FIG. 5 is a flowchart illustrating the nozzle touch force control processing executed at regular intervals in the injection/pressure-maintaining step according to the second embodiment.

FIG. 5 is a flowchart of a nozzle touch force control processing executed in the injection/pressure-maintaining step at regular intervals according to the second embodiment of the present invention. In the injection/pressure-maintaining step, the CPU 30 for PMC executes the same processings as those of the steps 100 to 102 of the first embodiment, reads the speed V of injection, finds the acceleration A, and stores the injection speed V found in the above period as the injection speed $V_0$ of the previous period in the processing of the next period (steps 200 to 202). The acceleration A found at step 201 is multiplied by a predetermined coefficient β to find a torque component T that is produced due to the force of inertia of the moving portion in the injection unit 10 at the time of acceleration or deceleration and that affect the nozzle touch force (step 203). The thus found torque component T is added to the torque instruction $T_0$ that has been set, which is, then, output as a torque instruction to the electric motor 3'. Hereinafter, this processing is executed during the injection/pressure-maintaining step at regular intervals.

Figure 9A:
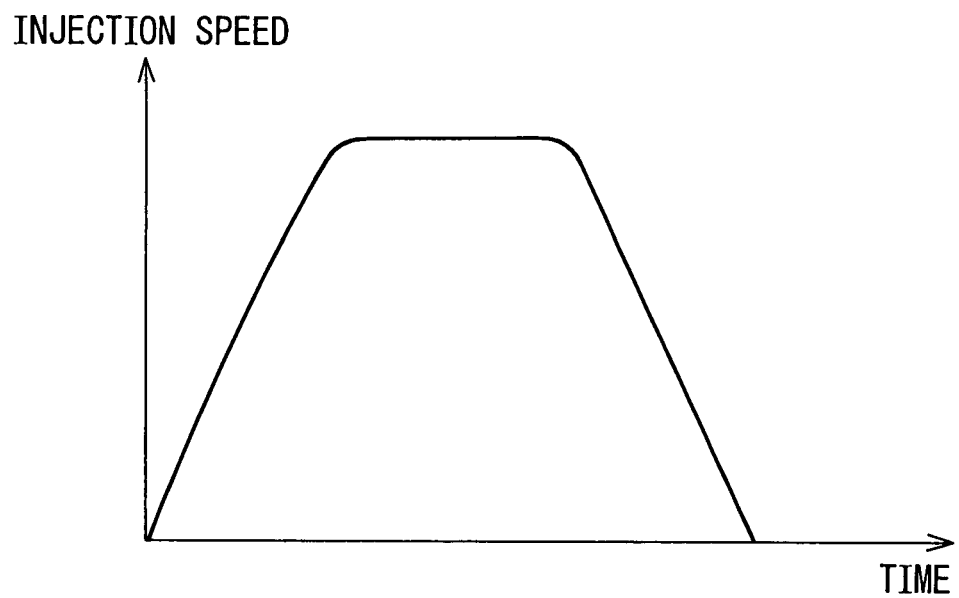
FIG. 9a is a diagram illustrating a change in the injection speed in the injection operation using a conventional nozzle touch mechanism.
Figure 9B:
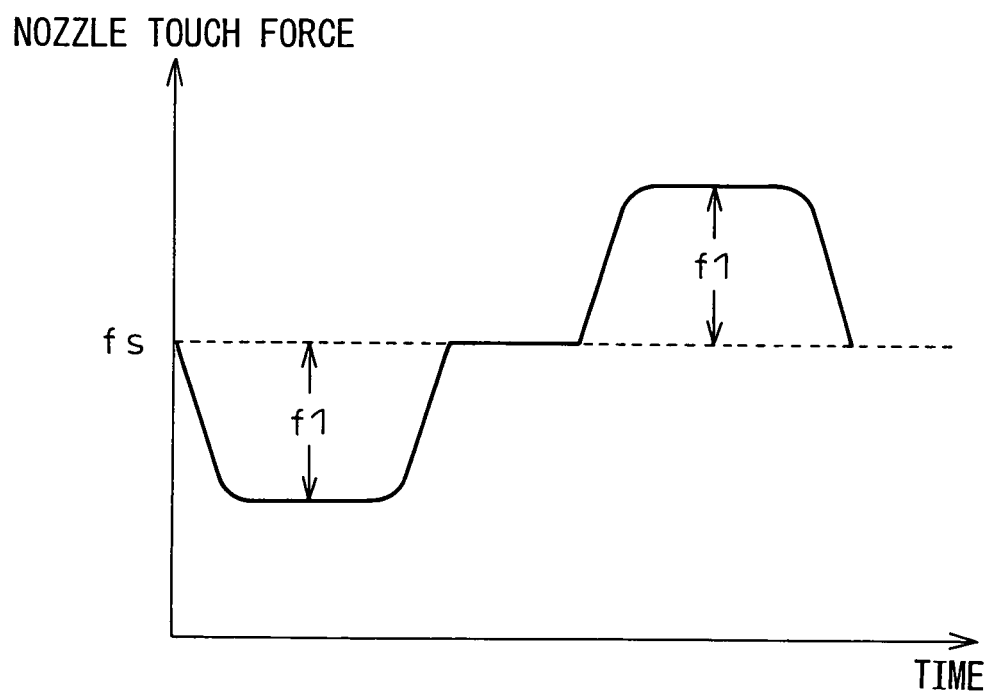

When the injection speed is increasing at the start of injection, the acceleration A assumes a positive value, the torque component T found at step 203 assumes a positive value, too, and a torque instruction output at step 204 becomes greater than the preset torque instruction To by the torque component T. When the injection speed increases, on the other hand, the injection unit receives such a force that the nozzle touch force decreases as illustrated in FIGS. 9a and 9b. As a result, in a section where the injection speed increases, the force for moving the injection unit back due to an increase in the injection speed is cancelled by the torque component T that is generated by the electric motor 3' to move the injection unit forward, whereby the nozzle touch force is maintained at near the force fs corresponding to the preset torque instruction $T_0$. When the injection speed decreases, further, the torque component T found at step 203 assumes a negative sign, and the torque instruction to the electric motor 3' specifies a decrease. Accompanying a decrease in the injection speed, however, a force of inertia is added to move the injection unit 10 forward. Therefore, as shown in FIG. 8b, the nozzle touch force is maintained at near the force fs corresponding to the preset torque $T_O$.

Figure 6:
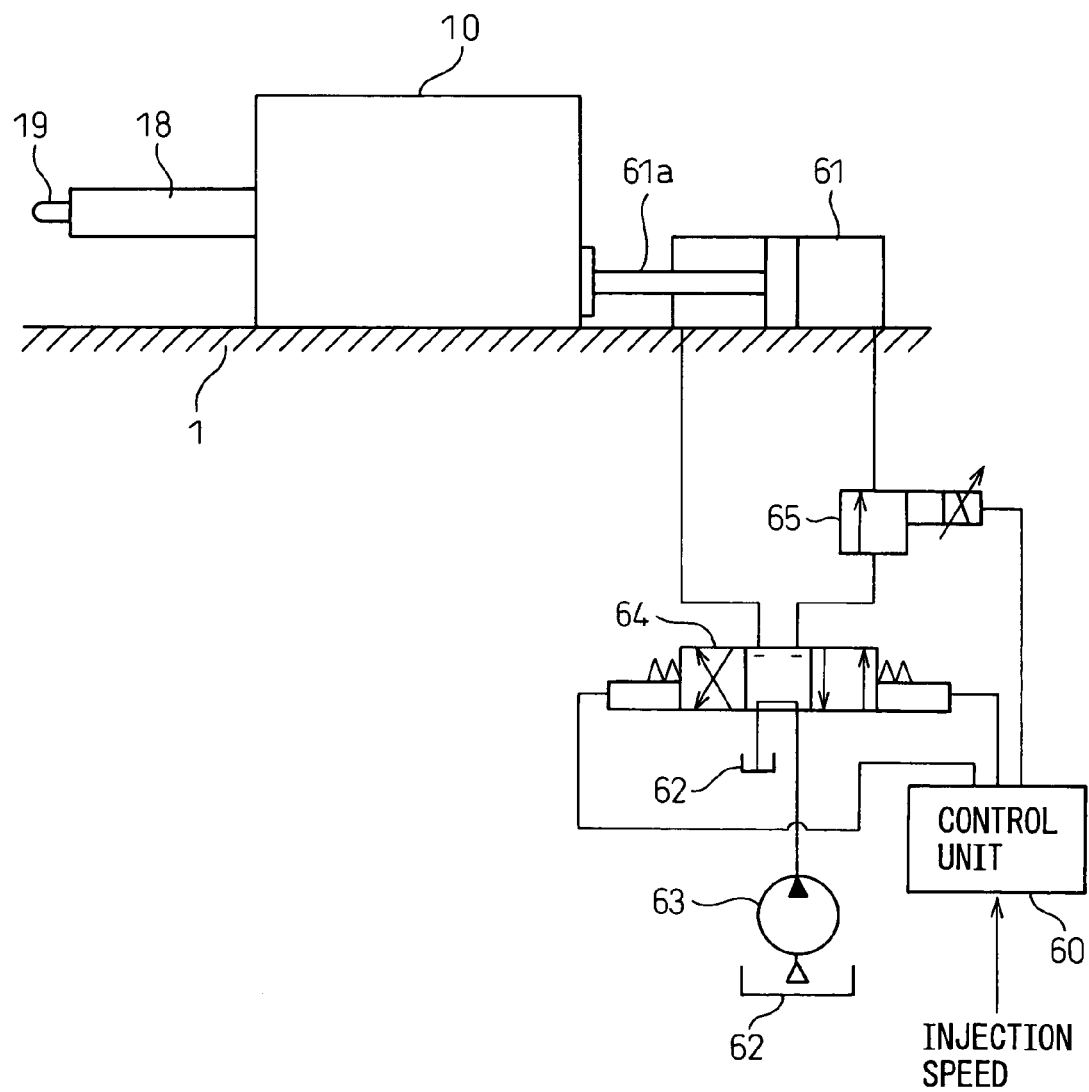
FIG. 6 is a view schematically illustrating a third embodiment of the present invention.

FIG. 6 is a diagram schematically illustrating a third embodiment of the present invention. The third embodiment is constituted so as to operate the nozzle touch force generating unit with hydraulic pressure. In FIG. 6, reference numeral 10 denotes an injection unit placed on a base 1 of the injection-molding machine so as to move, reference numeral 18 denotes a heating cylinder, and reference numeral 19 denotes a nozzle. The injection unit 10 moves in the right-and-left direction in FIG. 6 due to a hydraulic cylinder 61, so that the nozzle 19 is brought into contact with, or separates away from, the metal mold, which is not shown. Reference numeral 62 denotes an oil tank, 63 denotes a pump, 64 denotes a change-over valve, 65 denotes a proportional electromagnetic relief valve for controlling the hydraulic pressure, and reference numeral 60 denotes a control system for controlling the nozzle touch force generating unit.

When the injection unit 10 is moved forward to bring the nozzle 19 in touch with the metal mold, the control system moves the change-over valve 64 toward the left in FIG. 6 whereby the operation fluid sucked by the pump 63 from the oil tank 62 is introduced into an operation chamber on the right side of the hydraulic pressure cylinder 61 through the change-over valve 64 and the proportional electromagnetic relief valve 65 causing a piston 61a to protrude and the injection unit 10 to move toward the left. When the nozzle 19 comes in contact with the metal mold and the injection unit no longer moves, the control system 60 sends, to the proportional electromagnetic relief valve 65, an instructed pressure Pr (voltage instruction) that corresponds to a preset nozzle touch force, so that the nozzle 19 is pushed onto the metal mold with the preset nozzle touch force. To separate the nozzle 19 from the metal mold, on the other hand, the change-over valve 64 is moved toward the right to introduce the operation fluid from the pump 63 into an operation chamber on the left side of the hydraulic cylinder 61, whereby the injection unit 10 moves toward the right in FIG. 6 and the nozzle 19 separates away from the metal mold.

Figure 7:
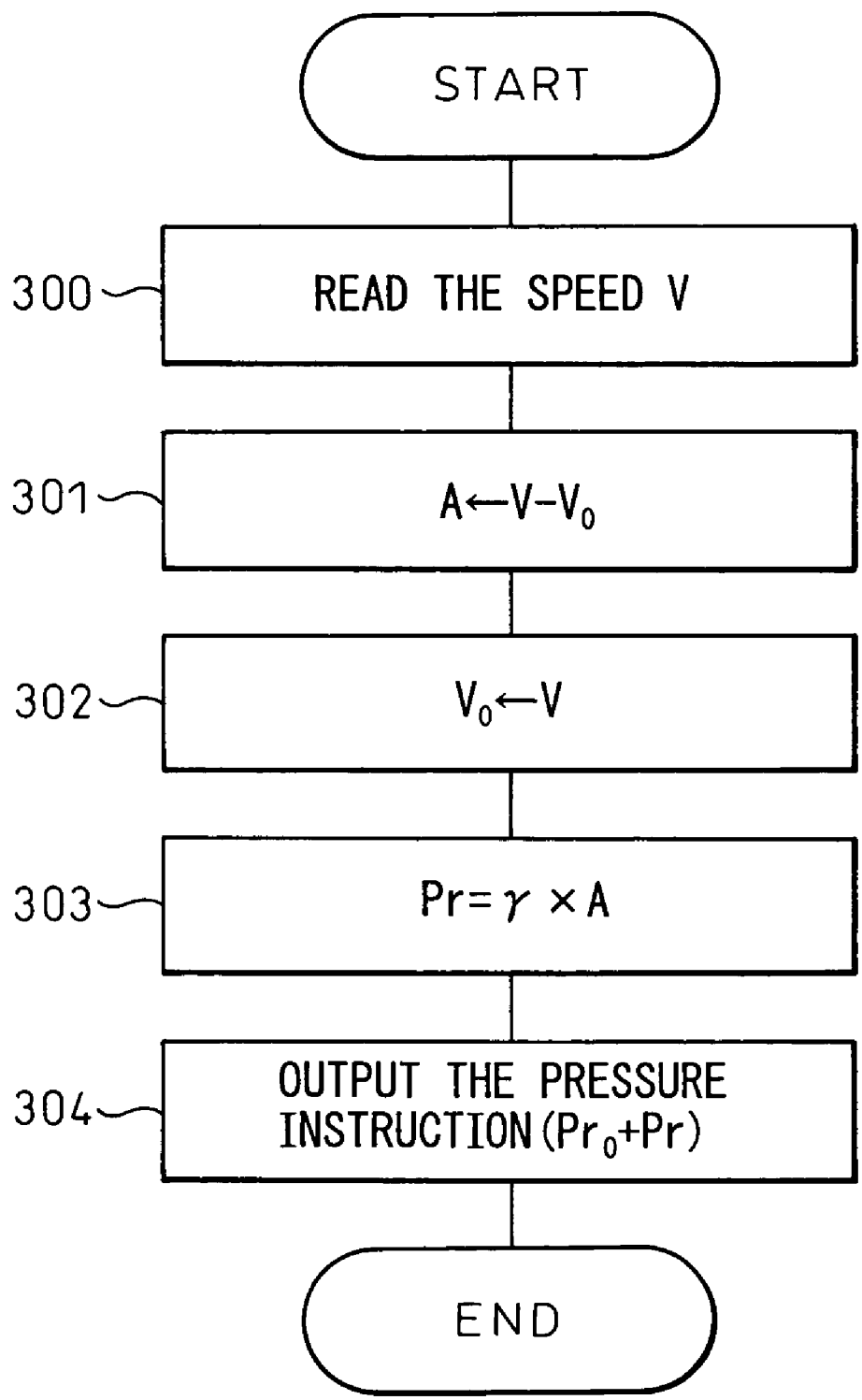
FIG. 7 is a flowchart illustrating the nozzle touch force control processing executed at regular intervals in the injection/pressure-maintaining step according to the third embodiment.

When the injection/pressure-maintaining step is executed in a state where the nozzle 9 is pushed onto the metal mold with the preset nozzle touch force as described above, the processor in the control system 60 executes a processing of FIG. 7 at regular intervals.

First, the injection speed V is read out through the control system that controls the injection-molding machine (step 300), and an acceleration A is found by subtracting the injection speed $V_0$ read in the previous period from it (step 301). The speed V read for executing the processing of the next period is stored as the speed $V_0$ of the previous period (step 302), and the acceleration found at step 301 is multiplied by a predetermined coefficient γ to find a pressure Pr corresponding to the acceleration (step 303). The thus found pressure Pr is added to a pressure $Pr_0$ that corresponds to the preset nozzle touch pressure, and the added pressure ($Pr_0$+Pr) is output as a pressure instruction of the above period to the proportional electromagnetic relief valve 65. Hereinafter, this processing is executed during the injection/pressure-maintaining step at regular intervals.

As a result of this processing, the nozzle touch force is maintained nearly at the preset value fs during the injection/pressure-maintaining step as shown in FIG. 8b preventing either a drop in the nozzle touch force or the generation of an excess of nozzle touch force. Namely, in a section where the injection speed increases, the injection unit 10 receives a force of inertia in the direction of moving back and works to decrease the nozzle touch force, however, the hydraulic pressure acting on the hydraulic cylinder 61 increases correspondingly to push the injection unit 10 onto the metal mold. Therefore, the force acting on the injection unit is such that the force due to the force of inertia during the acceleration of injection is cancelled by the hydraulic force that is added to the hydraulic cylinder and, hence, the nozzle touch force is maintained at near the preset value fs. The same also holds when the injection speed decreases; i.e., the force for moving the injection unit forward due to a decrease in the injection speed is cancelled by the force that is added to the hydraulic cylinder to decrease the hydraulic pressure and, hence, the preset nozzle touch force is maintained at fs.

In the above-mentioned embodiments, the speed of the injection screw and the like is detected, and the acceleration of the moving part that moves at the time of injection is found from the detected speed. However, it is also possible to directly detect the acceleration of the injection screw by providing an acceleration sensor.

The nozzle touch force generating unit may include the one having a motor and a spring as in the first embodiment, and the one having a cylinder as in the third embodiment. In this case, the spring is expanded and contracted by the motor, the injection unit is pressurized relying upon the amount of expansion or contraction and is, further, pressurized by utilizing the cylinder output to impart the nozzle touch force relying upon the two, and either one of them may be controlled based upon the acceleration of injection to compensate for a change in the nozzle touch force caused by the force of inertia of the injection moving portion. Similarly further, the nozzle touch force generating unit may be the one having the nozzle touch force generating unit of the first embodiment and the nozzle touch force generating unit of the second embodiment, or may, further, be the one having the nozzle touch force generating device of the second embodiment and the nozzle touch force generating unit of the third embodiment. Here, either one of the nozzle touch force generating units is used to correct a change in the nozzle touch force caused by the force of inertia of the moving portion accompanying the injection operation, in order to maintain the nozzle touch force at a preset value.

If the nozzle touch force is controlled by feedback by using a distortion sensor as in the invention of Japanese Examined Patent Publication (Kokoku) No. 7-106580, it is possible to prevent the effect of the force of inertia of the moving member in the injection unit during the acceleration of injection requiring, however, the distortion sensor. As described in Japanese Unexamined Patent Publication (Kokai) No. 2001-124169, further, the moving member in the injection unit that operates at the time of injection may be provided with a moving member that moves in a direction opposite to the above moving member to cancel the force of inertia, so that no force of inertia acts, thereby to maintain the nozzle touch force constant. In this case, however, provision of the moving member that moves in the opposite direction causes the mass to become twice as great. As a result, when driven by using the motor of the same torque, the acceleration of injection is halved and the structure becomes complex. Further, the invention described in Japanese Unexamined Patent Publication (Kokai) No. 2003-191285 is not for controlling the nozzle touch force.

The present invention solves the above-mentioned problems, maintains the nozzle touch force constant, and prevents the leakage of the molten resin without exerting an excess of nozzle touch force to the metal mold.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. A system for controlling the nozzle touch force for an injection-molding machine having a base and an injection unit arranged on the base so as to move back and forth, comprising:
   a nozzle touch force generating unit for imparting a nozzle touch force to the injection unit;
   an arithmetic section for finding an acceleration of a moving part in the injection unit at the time of injection; and
   a control section for controlling increase or decrease of the nozzle touch force generated by the nozzle touch force generating unit depending upon the acceleration of the moving part.

2. The system for controlling the nozzle touch force as set forth in claim 1, wherein the arithmetic section finds the acceleration based on the injection speed read in a predetermined period.

3. The system for controlling the nozzle touch force as set forth in claim 1, wherein the nozzle touch force generating unit includes a spring and an electric motor for expanding and contracting the spring, generates the nozzle touch force relying upon the amount of expansion and contraction of the spring, and the control section measures the amount of expansion and contraction of the spring, and increases or decreases the amount of expansion or contraction of the spring by a correcting the amount of expansion or contraction calculated by multiplying the acceleration of the moving part of the injection unit by a preset value, to so control the electric motor as to produce a predetermined nozzle touch force.

4. The system for controlling the nozzle touch force as set forth in claim 1, wherein the nozzle touch force generating unit includes an electric motor the torque of which can be controlled to generate a nozzle touch force relying upon the output torque of the electric motor, and the control section increases or decreases a value of the output torque of the electric motor by a correcting torque value calculated by multiplying the acceleration of the moving part of the injection unit by the preset value, to so control the electric motor as to produce a predetermined nozzle touch force.

5. The system for controlling the nozzle touch force as set forth in claim 1, wherein the nozzle touch force generating unit includes a cylinder the pressure of which can be controlled to generate a nozzle touch force relying upon the pressure of the cylinder, and the control section increases or decreases a value of the pressure in the cylinder by a correcting pressure value calculated by multiplying the acceleration of the moving part of the injection unit by the preset value, to so control the cylinder as to produce a predetermined nozzle touch force.

* * * * *